United States Patent
Dietzsch et al.

(10) Patent No.: US 7,035,002 B2
(45) Date of Patent: Apr. 25, 2006

(54) REFLECTOR TURRET FOR AN INVERTED MICROSCOPE

(75) Inventors: Leander Dietzsch, Jena (DE); Matthias Gonschor, Gleichen (DE); Ralph Aschenbach, Goettingen (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/398,632

(22) PCT Filed: Oct. 2, 2001

(86) PCT No.: PCT/EP01/11368

§ 371 (c)(1),
(2), (4) Date: Aug. 8, 2003

(87) PCT Pub. No.: WO02/29468

PCT Pub. Date: Apr. 11, 2002

(65) Prior Publication Data

US 2004/0027683 A1 Feb. 12, 2004

(30) Foreign Application Priority Data

Oct. 6, 2000 (DE) .............................. 100 50 677

(51) Int. Cl.
*G02B 21/00* (2006.01)
*G02B 11/04* (2006.01)

(52) U.S. Cl. ...................... 359/368; 359/514

(58) Field of Classification Search ........ 359/368–390, 359/507–512, 800–819, 601–615, 896
See application file for complete search history.

(56) References Cited

U.S. PATENT DOCUMENTS

| | | | | |
|---|---|---|---|---|
| 3,918,793 A | * | 11/1975 | Kraft .......................... | 359/389 |
| 3,930,713 A | * | 1/1976 | Stankewitz et al. .......... | 359/387 |
| 4,756,611 A | * | 7/1988 | Yonekubo et al. ........... | 359/370 |
| 4,770,520 A | | 9/1988 | Hoogesteger ................ | 359/368 |
| 5,128,808 A | * | 7/1992 | Dosaka ........................ | 359/821 |
| 5,138,486 A | | 8/1992 | Meyer et al. ................ | 359/389 |
| 5,608,574 A | * | 3/1997 | Heinrich ...................... | 359/510 |
| 5,896,224 A | | 4/1999 | Kapitza ....................... | 359/389 |
| 6,101,029 A | | 8/2000 | Gaul et al. ................... | 359/390 |
| 6,130,769 A | * | 10/2000 | Tempest ....................... | 359/212 |

FOREIGN PATENT DOCUMENTS

| | | | | |
|---|---|---|---|---|
| DE | 2316386 | | 10/1974 | |
| DE | 197 46 661 | | 5/1999 | |
| JP | 6-208058 | * | 7/1994 | ................. 359/368 |
| JP | 9-304702 | * | 11/1997 | ................. 359/817 |
| JP | 2000-221408 | * | 8/2000 | ................. 359/511 |

* cited by examiner

*Primary Examiner*—Thong Q. Nguyen
(74) *Attorney, Agent, or Firm*—Reed Smith LLP

(57) ABSTRACT

A reflector turret for an inverted microscope, having a cover which is water-tight at least at the top and substantially light-tight outside the microscope beam path, wherein a protective glass is fitted into the upper part of the cover in the light path so as to be tight against liquid, and the protective glass is removable and/or exchangeable.

8 Claims, 3 Drawing Sheets

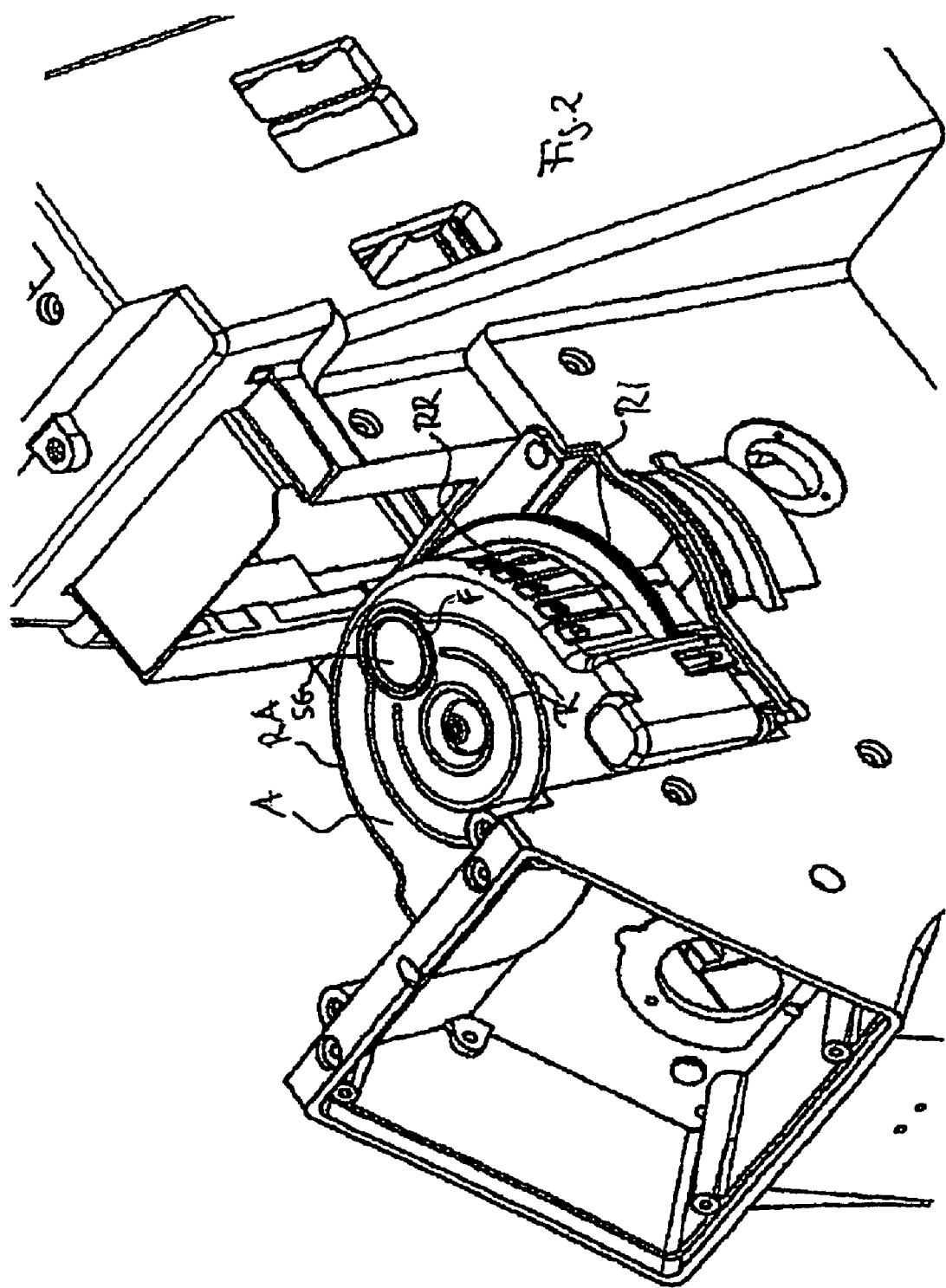

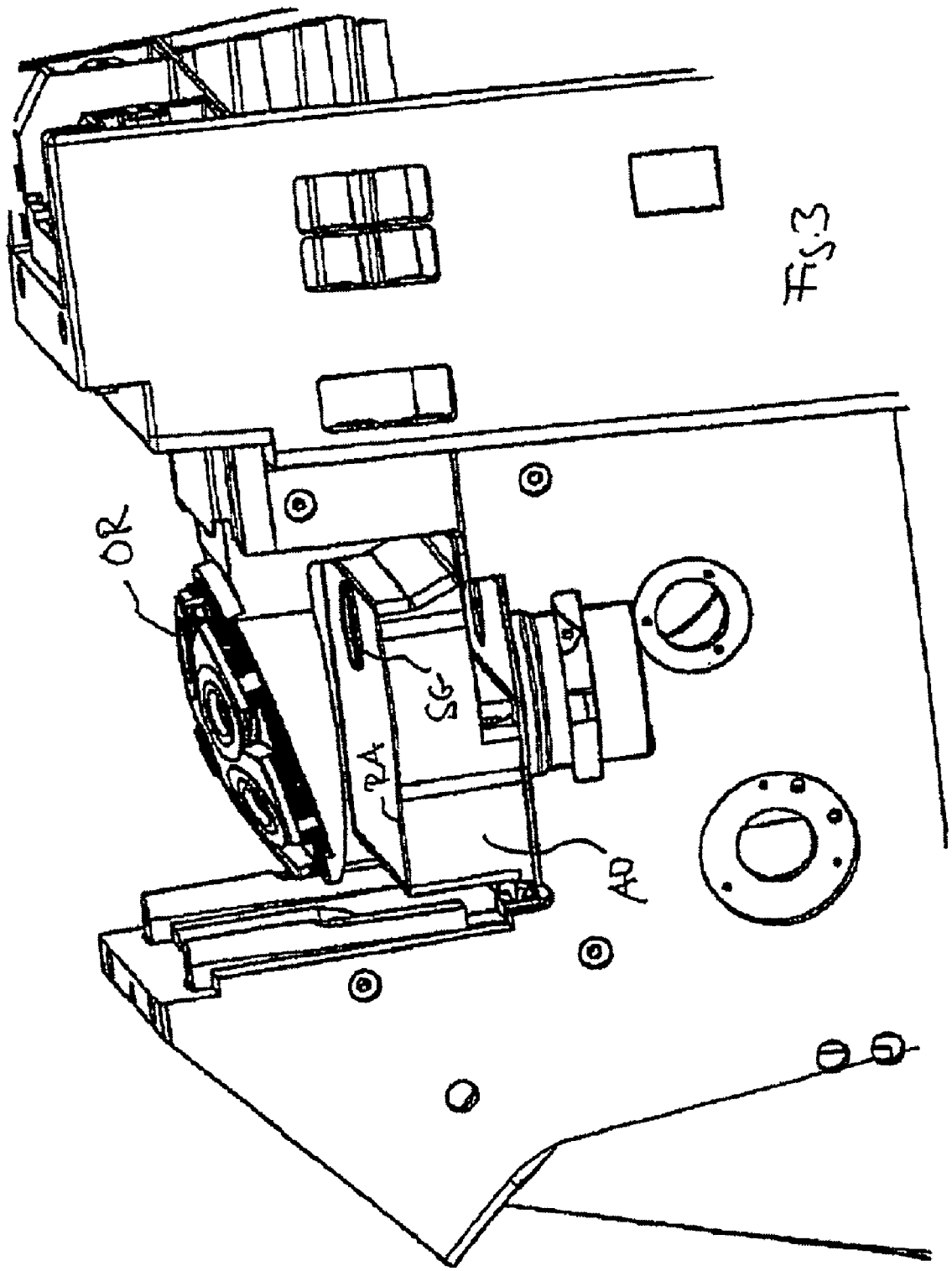

REFLECTOR TURRET FOR AN INVERTED MICROSCOPE

CROSS-REFERENCE TO RELATED APPLICATIONS

This application claims priority of International Application No. PCT/EP01/11368 filed Oct. 2, 2001 and German Application No. 100 50 677.1, filed Oct. 6, 2000, the complete disclosures of which are hereby incorporated by reference.

BACKGROUND OF THE INVENTION a) Field of the Invention

The invention is directed to a fluorescence turret for inverted microscopes which contains fluorescence cubes. These fluorescence cubes can be brought into operative position selectively in order to carry out different examinations in fluorescence microscopy.

b) Description of the Related Art

As is known, these fluorescence cubes comprise exciter filters in the direction of the light source, dichroic splitter mirrors and blocking filters in the observation direction. Turrets of this kind are known from DE 2316386, for example.

OBJECT AND SUMMARY OF THE INVENTION

It is the object to improve on the design of fluorescence turrets for inverted microscopes and to overcome disadvantages of the prior art.

In accordance with the invention, a reflector turret for an inverted microscope comprises a cover which is water-tight at least at the top and substantially light-tight outside the microscope beam path.

BRIEF DESCRIPTION OF THE DRAWINGS

In the drawings:

FIG. 2 shows a reflector turret having a knurled ring for manually changing the reflector position; and FIG. 3 illustrates the arrangement when no reflector turret is provided.

DESCRIPTION OF THE PREFERRED EMBODIMENTS

Figure 1:
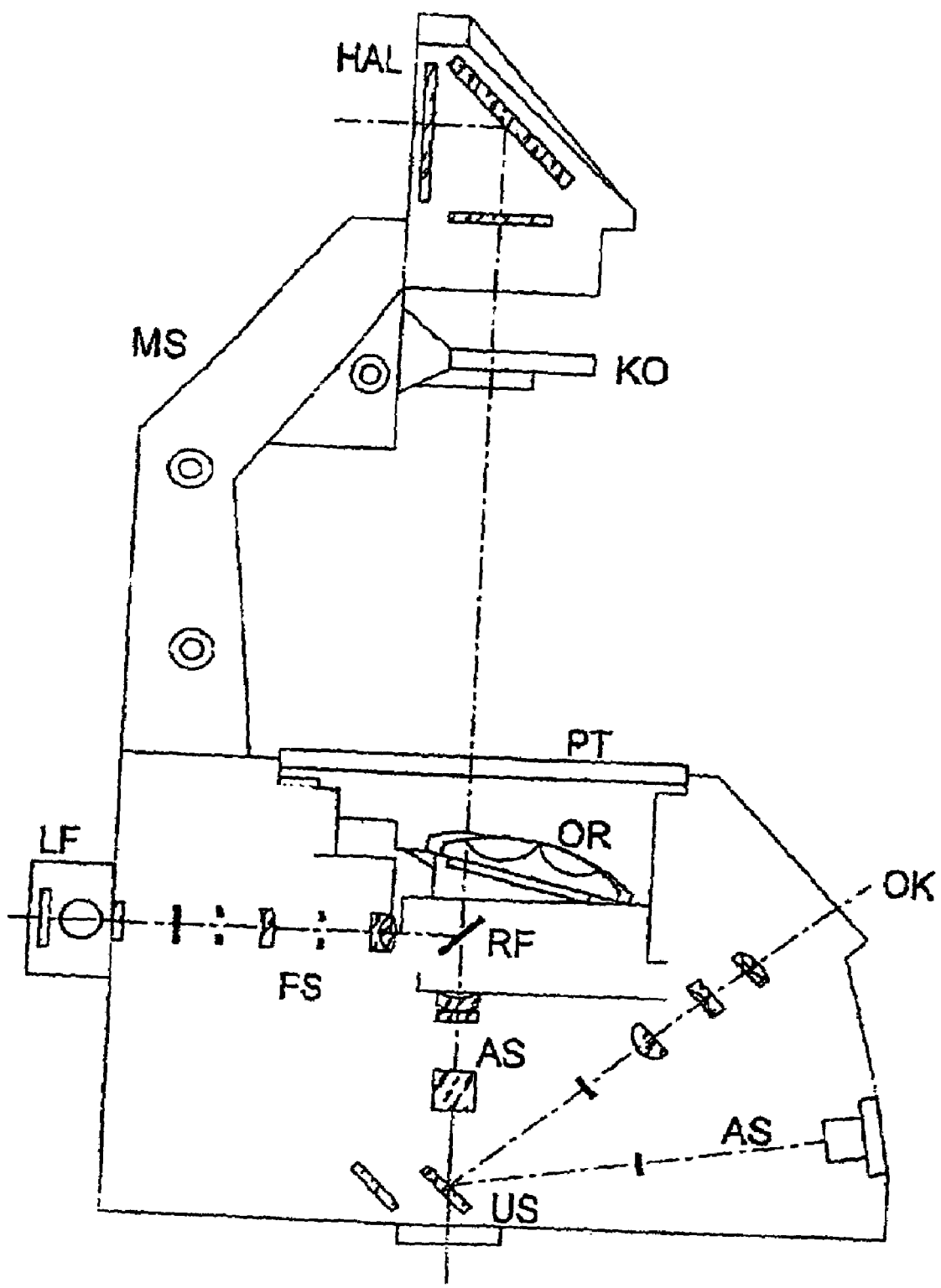
FIG. 1 shows, in schematic form, an inverted microscope.

The beam path of an inverted microscope is shown schematically in FIG. 1. A halogen lamp HAL at the microscope stand MS illuminates an object located on the specimen table PT via a condenser KO. Located below the specimen table is an objective turret OR, shown without the objective lenses which are inserted therein, and a reflector RF which is part of a reflector turret, not shown, and which can be switched on to reflect in a fluorescence excitation beam path FS of a light source LF. The imaging beam path AS is deflected in the direction of the eyepiece OK (not shown) of the observer by a deflecting mirror US. Further, a recording beam path AS is provided for photographic recordings.

FIG. 2: Located below the objective turret OR, not shown, is the reflector turret RR which has a knurled ring RI for manually changing the reflector position which serves in the motorized construction as a toothed rim for driving by means of a combined motor/transmission, not shown. The reflector turret has a cover A, preferably in the form of a hood with a trough-shaped surface in which grooves R are worked in for receiving liquid, which grooves R accordingly prevent liquid from flowing out, and a raised edge RA which prevents liquid from flowing out into the lower parts of the microscope.

A protective glass SG is provided in the cover A. This protective glass SG releases the optical beam path downward and protects against liquid at the same time. The protective glass is removable for cleaning, changing or in case of troublesome reflections and, for this purpose, is located in a frame F which snaps into the hood. However, the glass plate of the protective glass SG itself is advantageously fitted into the cover A at an angle not equal to 90° to the optical axis, preferably with a deviation of 3 to 5 degrees from the vertical.

FIG. 3: When no reflector turret is provided, a similarly shaped, empty, light-proof and liquid-tight cover AD is used in its place, likewise with an edge RA with a slight trough shape and exchangeable protective glass SG in order to protect the area below the objective turret from unwanted light and liquid.

While the foregoing description and drawings represent the present invention, it will be obvious to those skilled in the art that various changes may be made therein without departing from the true spirit and scope of the present invention.

The invention claimed is:

1. A reflector turret device for an inverted microscope, comprising:
   a reflector turret spaced from an objective of the inverted microscope; and
   a cover for the reflector turret which is water-tight at least at the top of the cover and substantially light-tight outside a microscope beam path.

2. The reflector turret according to claim 1, wherein the cover has grooves and/or an ascending edge for guiding off liquid.

3. An inverted microscope comprising a reflector turret according to claim 1.

4. The reflector turret device according to claim 1, further comprising a protective glass fitted into an upper part of the cover in the microscope beam path so as to be tight against liquid.

5. The reflector turret device according to claim 4, wherein the protective glass is removable or exchangeable.

6. The reflector turret device according to claim 4, wherein the protective glass is arranged at an angle diverging from a perpendicular line relative to the optical axis of the microscope beam path.

7. The reflector turret device according to claim 6 wherein the protective glass is arranged at an angle of between 2 and 5 degrees from the perpendicular line relative to the optical axis of the microscope beam path.

8. The reflector turret device according to claim 1, wherein the reflector turret is operable to move a reflector to switch in an alternate illumination beam.

* * * * *